United States Patent
Kölbl et al.

(10) Patent No.: US 11,846,346 B2
(45) Date of Patent: Dec. 19, 2023

(54) GEAR UNIT FOR A VEHICLE AND POWERTRAIN WITH SUCH A GEAR UNIT

(71) Applicant: ZF FRIEDRICHSHAFEN AG, Friedrichshafen (DE)

(72) Inventors: Thomas Kölbl, Ruderting (DE); Matthias Reisch, Ravensburg (DE); Michael Roske, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/102,431

(22) Filed: Jan. 27, 2023

(65) Prior Publication Data
US 2023/0243408 A1    Aug. 3, 2023

(30) Foreign Application Priority Data
Feb. 3, 2022   (DE) .................... 10 2022 201 144.9

(51) Int. Cl.
*F16H 48/10*   (2012.01)
*B60K 17/16*   (2006.01)
(Continued)

(52) U.S. Cl.
CPC .............. *F16H 48/10* (2013.01); *B60K 1/00* (2013.01); *B60K 17/165* (2013.01); *F16H 48/22* (2013.01);
(Continued)

(58) Field of Classification Search
CPC .............. F16H 48/22; F16H 2048/104; F16H 2048/106; F16H 48/10; B60K 2001/001; B60K 17/165; B60K 17/20
See application file for complete search history.

(56) References Cited

U.S. PATENT DOCUMENTS

| 5,527,229 A * | 6/1996 | Ishihara ................. F16H 48/22 |
| | | 475/248 |
| 10,300,905 B2 * | 5/2019 | Holmes ................... F16H 48/10 |
(Continued)

FOREIGN PATENT DOCUMENTS

| DE | 19636052 | 3/1997 |
| DE | 102008000444 | 9/2009 |
(Continued)

OTHER PUBLICATIONS

Office Action of corresponding German Patent Application No. 10 2022 201 144.9.
(Continued)

*Primary Examiner* — Sherry L Estremsky
(74) *Attorney, Agent, or Firm* — Cozen O'Connor

(57) ABSTRACT

A gear unit includes an input shaft, output shafts and a differential having two planetary gearsets with a plurality of gearset elements. A first gearset element is connected to the input shaft, a second gearset element is connected to the first output shaft, and a third gearset element is connected to a gearset element of the second planetary gearset. A second gearset element of the second planetary gearset is connected to a housing, and a third gearset element of the second planetary gearset is connected to the second output shaft. A first output torque transmittable to the first output shaft. The gearset elements of the first planetary gearset and second planetary gearset have a helical toothing such that a torque is transmittable between the two output shafts.

14 Claims, 6 Drawing Sheets

(51) Int. Cl.
*B60K 1/00* (2006.01)
*F16H 48/22* (2006.01)
(52) U.S. Cl.
CPC .. *B60K 2001/001* (2013.01); *F16H 2048/104* (2013.01); *F16H 2048/106* (2013.01)

(56) References Cited

U.S. PATENT DOCUMENTS 11,255,419 B2 * 2/2022 Lindtner ................. F16H 48/10
11,572,940 B2 * 2/2023 Isono ..................... F16H 48/40

FOREIGN PATENT DOCUMENTS

| DE | 102011085119 | 2/2013 |
| DE | 102017212781 | 1/2019 |
| DE | 102019205750 | 10/2020 |
| DE | 102019216510 | 4/2021 |

OTHER PUBLICATIONS

Search Report dated Dec. 16, 2022 issued in German Patent Application No. 10 2022 201 144.9.

* cited by examiner

GEAR UNIT FOR A VEHICLE AND POWERTRAIN WITH SUCH A GEAR UNIT

BACKGROUND OF INVENTION

1. Field of the Invention

The disclosure is directed to a gear unit for a powertrain of a vehicle and to a powertrain with such a gear unit.

2. Description of Related Art

DE 10 2019 205 750 A1 discloses a gear unit comprising an input shaft, a first output shaft, a second output shaft, a first planetary gearset, and a second planetary gearset connected to the first planetary gearset. The planetary gearsets comprise a plurality of elements in each instance, the input shaft, the two output shafts, the planetary gearsets, and elements thereof being arranged and formed in such a way that a torque introduced by the input shaft is converted and divided in a defined ratio between two output shafts. In so doing, the formation of a sum torque is prevented. At least one element of the first planetary gearset is connected to another element of the second planetary gearset so as to be fixed with respect to rotation relative to it, and a further element of the secondary planetary gearset is secured to a structural component that is fixed with respect to relative rotation.

In a bevel gear differential, the spreading effect of the bevel gears under torque is used to generate friction between the respective bevel gear and the differential carrier and to achieve a desired locking effect in this way. This effect can be amplified through the use of additional friction plates. Analogously, friction forces which depend on the engagement forces are also utilized in spur gear differentials to achieve a torque-dependent locking effect. The principle of torque-dependent locking effect is known, inter alia, from DE 10 2008 000 444 A1.

It is known both in bevel gear differentials and in spur gear differentials to utilize preloaded bearing surfaces or sliding surfaces to generate a locking effect. This is known, e.g., from DE 10 2011 085 119 B3. The locking effect is not dependent on rotational speed or torque.

Combinations of the above-mentioned locking effect principles are also frequently used.

SUMMARY OF THE INVENTION

One aspect of the present invention is a gear unit for a powertrain of a vehicle which makes possible an improved traction and an improved driving behavior. One aspect of the invention is a powertrain with such a gear unit.

A gear unit according to one aspect of the invention for a powertrain of a vehicle comprises an input shaft, a first output shaft, a second output shaft and an integral differential which is operatively arranged between the input shaft and the two output shafts. The differential comprises a first planetary gearset with a plurality of gearset elements and a second planetary gearset with a plurality of gearset elements which is operatively connected to the first planetary gearset. A first gearset element of the first planetary gearset is connected to the input shaft so as to be fixed with respect to rotation relative to it, a second gearset element of the first planetary gearset is connected to the first output shaft so as to be fixed with respect to rotation relative to it, and a third gearset element of the first planetary gearset is connected to a first gearset element of the second planetary gearset so as to be fixed with respect to rotation relative to it. A second gearset element of the second planetary gearset is connected to a stationary structural component so as to be fixed with respect to rotation relative to it, and a third gearset element of the second planetary gearset is connected to the second output shaft so as to be fixed with respect to rotation relative to it. A first output torque is at least indirectly transmittable to the first output shaft by means of the first planetary gearset. A reaction torque of the first planetary gearset can be converted in the second planetary gearset in such a way that a second output torque corresponding to the first output torque is transmittable to the second output shaft. The gearset elements of the first planetary gearset and second planetary gearset have a helical toothing which generates a torque-dependent axial force which acts on connection means, these connection means being arranged and formed to at least indirectly connect the first output shaft and second output shaft in such a way independent from the axial force direction from the helical toothing of the gearset elements that a torque is transmittable between the two output shafts.

In such a gear unit, the sums of both wheel torques are not joined or combined to form a common axle torque in a component part. Instead, the propulsion power introduced into the input shaft is divided in the integral differential and, corresponding to the construction and connection of the planetary gearsets, is conveyed to the output shafts which are operatively connected to the latter. Therefore, the component parts of the integral differential can be formed slimmer because of the comparatively small torque. Further, the quantity of component parts and weight are reduced. Consequently, a gear unit is provided in which, by the integral differential, the two functions of torque conversion and torque distribution as well as a locking effect which were previously carried out by separate assemblies can be performed by an individual integral assembly. Accordingly, one aspect of the invention relates to a combined transmission/differential gear unit which realizes a torque conversion on the one hand and distributes torque to the output shafts on the other hand. In addition, a power splitting is realized.

Within this framework, an integral differential is understood as a differential with a first planetary gearset and with a second planetary gearset that is operatively connected to the first planetary gearset The first planetary gearset is drivingly connected to the input shaft, to the second planetary gearset and at least indirectly to the first output shaft. Further, the second planetary gearset is drivingly connected to the second output shaft and is supported at a stationary structural component. By an integral differential of this kind, the input torque at the input shaft can be converted and can be distributed or transmitted to the two output shafts in a defined ratio. Preferably, 50%, that is, one half, of the input torque is transmitted to each output shaft.

The input shaft, the two output shafts, the planetary gearsets and gearset elements thereof are arranged and formed in such a way that a torque introduced via the input shaft is converted in the differential and divided between the two output shafts in a defined ratio. Accordingly, the differential has no component part to which the sum of the two output torques is applied. In other words, a sum torque is prevented. Further, at identical output speeds of the output shafts, the differential has no direct-driving teeth or teeth revolving without rolling motion. Consequently, irrespective of the output speeds of the output shafts, there is always a relative movement of the component parts of the differential which are in meshing engagement with one another. The output shafts of the gear unit are configured in particular to be operatively connected to a wheel of the vehicle. The respective output shaft can be connected to the associated wheel directly or indirectly, that is, via a joint and/or a wheel hub, for example.

Consequently, the integral differential is constructed as a planetary gear unit with planetary gearsets and gearset elements comprising sun gear, ring gear and a plurality of planet gears guided by a planet carrier on an orbit around the sun gear. By "planetary gearset" is meant a unit having a sun gear, a ring gear and one or more planet gears guided by a planet carrier on an orbit around the sun gear, the planet gears being in meshing engagement with the ring gear and the sun gear.

The utilized axial force preferably originates from the second planetary gearset. The level and direction of the axial force from the helical toothing of the gearset elements are torque-dependent. The greater the acting torque, the greater the axial force resulting from it. Depending on the axial force, the connection device are brought to the activated or actuated state in which the two output shafts are coupled depending on the axial force. The direction of the axial force or the torque direction depends on whether the drive is running in traction mode, or pull operation, or in coast mode, or push operation. The axial force from the helical toothing is supported at at least one connection element of the connection device regardless of the operative direction such that the axial force present at the connection device is converted into a torque. The torque direction, which is transmitted by the connection device, depends on which wheel of the respective axle rotates faster or which output shaft rotates faster. The connection device transmit a torque regardless of the torque direction at the helical toothing. In other words, the torque direction of the helical toothing depends on whether the gear unit runs in pull operation or in push operation. The torque direction in the connection device is influenced depending on whether the vehicle is cornering to the left or to the right, for example. A respective torque can be transmitted between the two output shafts in pull operation and push operation by the gear unit suggested herein.

A gear unit is provided that can perform the functions of torque conversion, torque distribution and locking effect between the output shafts through an individual integral assembly. Accordingly, a gear unit with an integral differential is provided, inter alia, which has a self-locking function analogous to known limited-slip differentials, and actuation forces result in pull operation and push operation from the axial engagement forces of the helical toothing of the gearset elements.

The input shaft is preferably adapted to be connected to a drive unit, particularly an electric machine or an internal combustion engine, for introducing a torque into the gear unit. The input shaft is accordingly connected at least indirectly to a driveshaft of the drive unit so as to be fixed with respect to rotation relative to it. The drive unit generates a propulsion power, which is transmitted to the input shaft via the driveshaft. The driveshaft of the drive unit can be connected to the input shaft so as to be fixed with respect to rotation relative to it. Alternatively, the driveshaft and the input shaft constitute a cohesive or integral component part. Depending on the construction of the powertrain, two or more input shafts can be provided, particularly when the powertrain is a hybridized powertrain and, therefore, two or more drive units are provided.

The input shaft is preferably formed as a hollow shaft. The input shaft is preferably adapted for radially receiving the first coupling shaft. In other words, the first coupling shaft is guided through the input shaft. Accordingly, the first coupling shaft is guided through the gear unit "in-line", so to speak, in order to transmit a propulsion power to the wheel that is operatively connected to it. Accordingly, the output shafts can advantageously be arranged coaxial to one another. As a result of the coaxial arrangement of the output shafts, a radially narrow construction of the gear unit can be realized.

By "shaft" is meant a rotatable component part of the gear unit via which associated components of the gear unit are connected to one another so as to be fixed with respect to relative rotation. The respective shaft can connect the components axially or radially or both axially and radially. The term "shaft" does not apply exclusively, for example, to a cylindrical, rotatably supported machine element for transmitting torque. On the contrary, it can also refer to common connecting elements which connect individual component parts or elements to one another, in particular to connection elements which connect a plurality of elements to one another so as to be fixed with respect to relative rotation.

By "axial" is meant within the meaning of the invention an orientation in direction of a longitudinal central axis along which the planetary gearsets and the output shafts are arranged so as to extend coaxial to one another. By "radial" is meant an orientation in diameter direction of a shaft extending on this longitudinal central axis.

In principle, the planetary gearsets of the gear unit, in particular of the integral differential, may be arranged relative to one another and operatively connected to one another in any manner in order to realize a desired transmission ratio. According to an embodiment example, the first gearset element is a sun gear of the respective planetary gearset, the second gearset element is a planet carrier of the respective planetary gearset, and the third gearset element is a ring gear of the respective planetary gearset. The input shaft is accordingly connected to the sun gear of the first planetary gearset so as to be fixed with respect to rotation relative to it, the planet carrier of the first planetary gearset is connected to the first output shaft so as to be fixed with respect to rotation relative to it, and the ring gear at the planetary gearset is at least indirectly connected to the sun gear of the second planetary gearset so as to be fixed with respect to rotation relative to it. In particular, the ring gear of the first planetary gearset is connected via a coupling element, particularly a coupling shaft, to the sun gear of the second planetary gearset so as to be fixed with respect to rotation relative to it. According to an embodiment example according to the first aspect of the invention, the planet carrier of the second planetary gearset is connected to a stationary component part, particularly a gear unit housing, so as to be fixed with respect to rotation relative to it, and the ring gear of the second planetary gearset is connected to the second output shaft so as to be fixed with respect to rotation relative to it.

Further, additional component parts, for example, intermediate shafts or coupling shafts, can be arranged between the above-mentioned component parts, i.e., the gearset elements of the planetary gearsets, analogous to the above-mentioned coupling shafts.

One or more of the planetary gearsets are preferably formed, respectively, as negative planetary gearset or as positive planetary gearset. A negative planetary gearset corresponds to a planetary gearset with a planet carrier on which first planet gears are rotatably mounted, and with a sun gear and a ring gear, the teeth of at least one of the planet gears meshing with the teeth of the sun gear and also with the teeth of the ring gear so that the ring gear and the sun gear rotate in opposite directions when the sun gear rotates with fixed carrier. A positive planetary gearset differs from the negative planetary gearset in that the positive planetary gearset has first and second, or inner and outer, planet gears which are rotatably mounted on the planet carrier. The teeth of the first, or inner, planet gears mesh with the teeth of the sun gear on the one hand and with the teeth of the second, or outer, planet gears on the other hand. Further, the teeth of the outer planet gears mesh with the teeth of the ring gear. As a result, with the planet carrier being fixed, the ring gear and the sun gear rotate in the same direction. The gearset elements of the gear unit suggested herein have helical teeth in order to bring about the torque-dependent axial force for the transmission of torque between the two output shafts.

When one or more planetary gearsets are formed as positive planetary gearset, the connection of the planet carrier and ring gear is switched and the amount of the stationary gear ratio is increased by one. In the same sense, the reverse is also possible if a negative planetary gearset is to be provided instead of a positive planetary gearset. The connection between the ring gear and the planet carrier would then be switched compared to the planetary gearset, and a stationary gear ratio would be reduced by one and the sign would change. However, the two planetary gearsets are preferably constructed as negative planetary gearsets within the framework of the invention. Negative planetary gearsets have a high degree of efficiency and can be arranged axially side by side or radially nested.

Alternatively, it is also conceivable to form one or more planetary gearsets as stepped planetary gearsets. Each stepped planet gear of the respective stepped planetary gearset preferably comprises a first toothed wheel with a second toothed wheel connected to it so as to be fixed with respect to relative rotation. The first toothed wheel is in meshing engagement, for example, with the sun gear, and the second toothed wheel is correspondingly in meshing engagement with the ring gear, or vice versa. These two toothed wheels may be connected to one another so as to be fixed with respect to relative rotation, for example, via an intermediate shaft or a hollow shaft. In case of the later, this hollow shaft can be rotatably mounted on a pin of the planet carrier. The two toothed wheels of the respective stepped planet gear preferably have different diameters and numbers of teeth in order to adjust a transmission ratio. Moreover, combined planetary gearsets are also contemplated.

The first output shaft and second output shaft are passively connectable to one another via the connection device. In other words, the connection device are controllable in a passive manner by axial forces of the helical toothing of the gearset elements. By "passive" is meant in this context that the torque-transmitting connection between the output shafts can be carried out without a control device or actuator. Accordingly, the connection device are adapted to provide a torque-transmitting connection between the first output shaft and second output shaft without an actuator. In other words, a locking torque can be brought about without a control device or actuating device.

Preferably, the second gearset element of the first planetary gearset is supported so as to be axially fixed, and the third gearset element of the second planetary gearset is supported so as to be axially displaceable. The third gearset element of the second planetary gearset is mounted in a floating manner, and the second gearset element of the first planetary gearset is mounted to be axially fixed. The third gearset element, for example, the ring gear of the second planetary gearset, can move axially slightly so that the connection device can be activated depending on the applied axial forces which are transmitted from the helical toothing of the gearset elements to the third gearset element of the second planetary gearset. Within the meaning of the present invention, an axially displaceable bearing support has a few tenths of a millimeter of play in axial direction, i.e., the corresponding shaft or the corresponding gearset element is not definitively secured or fixed in axial direction. This allows engagement forces to be guided in direction of the respective connection element of the connection means in a simple manner. Further, floating or axially displaceable bearing supports are cost-effective, are inexpensive to produce and allow an expansion of the shaft or gearset element in the range of play caused, for example, by changes in temperature.

Further, within the framework of this invention, an axially displaceable bearing support of the third gearset element of the second planetary gearset or second gearset element of the first planetary gearset means that the respective gearset element is formed with a defined flexibility. To this effect, the axially displaceably supported gearset element is supported by a fixed bearing but, because of its precisely defined elastic construction, allows an axial movement of connection elements of the connection device relative to one another or away from one another. Alternatively or additionally, it is contemplated that the first output shaft is supported to be axially fixed and the second output shaft is supported to be axially displaceable, or vice versa. The second output shaft can be axially movably arranged via a movable bearing. Alternatively, a slip spline, for example, can be arranged between the third gearset element of the second planetary gearset and the second output shaft which is connected to the latter so as to be fixed with respect to rotation relative to it. This slip spline, while inhibiting a relative rotation, nevertheless allows an axial relative movement between the third gearset element of the second planetary gearset and the second output shaft.

It is preferable when a pitch of the helical toothing at the third element of the first planetary gearset and at the first element of the second planetary gearset is at least similar in size, preferably the same size, and preferably has the same sign. Identical size and identical sign, i.e., an identical pitch, make it possible for the connection component or coupling shaft to be free from axial force so that a costly thrust bearing support can be dispensed with. This also makes it possible for the forces from the helical toothing to be supported on the connection means according to the invention without routing these engagement forces via a housing bearing support with the resulting losses. This support on the connection means in turn ensures that activation energy and torque information with respect to the size and direction are provided at the connection means. In this case, axial forces act in particular on the first gearset element of the first planetary gearset and on the third gearset element of the second planetary gearset, and the axial forces are balanced out at all of the other gearset elements of the integral differential.

By "pitch" of a helical toothing is meant the axial path, measured along an associated rotational axis, which is needed in an imaginary continuation of a tooth beyond the actual width of the toothed gearwheel in order to cause a 360-degree revolution of the tooth around the axis. The term "thread pitch" is commonly used analogously referring to threads. Therefore, a helical-toothed gearwheel with a plurality of teeth is comparable to a multiple lead.

The sign of the helix angle is preferably selected such that forward in pull operation (and therefore also rearward in push operation) the first gearset element of the first planetary gearset and the third gearset element of the second planetary gearset act oppositely. Accordingly, the input shaft and the second output shaft act oppositely. This results in a torque-proportional pressing force at a bearing, for example, at the connection device between the two output shafts.

The connection device is preferably a frictionally engaging clutch. Consequently, the force-fitting connection between the output shafts can be frictionally produced and therefore particularly dependent on a pressing force. The connection depends on a torque-dependent pressing force that results from the engagement forces at the gearset elements. Accordingly, the axial forces of the helical toothing of the gearset elements are utilized for the pressing force. The connection device preferably has complementary friction surfaces so that a connection can be produced by frictional force. The connection devices preferably have at least two connection elements which can be brought into frictional engagement with one another, for example, in order to produce the locking effect. Alternatively, the respective connection element can be brought into frictional engagement directly with the second gearset element of the first planetary gearset or with the third gearset element of the second planetary gearset.

The differential achieves a torque-dependent locking effect which acts in both pull operation and push operation. The locking value can be identical or separately adjusted for pull operation and push operation depending on the construction of the connection device. Since the torque transmission or locking is carried out directly at the output shafts, the difference in force is only one half of that of a clutch which, for example, locks in a differential carrier. Therefore, fewer or smaller friction surfaces are necessary. Further, larger friction radii can be realized because the component parts of the differential need not be arranged in a comparably small differential carrier. Moreover, a cooling and lubricating effect can be improved over conventional limited slip differentials because the component parts, particularly the gearset elements, are more easily accessible. In this context, an existing cooling and lubrication of the planetary gearsets can be utilized to extend the same effects to the connection device as well. Coolant and lubricant can be distributed by means of centrifugal forces. Further, bore holes or openings can be provided in the gearset elements and/or housing parts of the gear unit for sufficient cooling of the connection device, particularly in the case of a locking or torque transmission. For example, pressurized oil can be guided out of the housing for supplying oil to the second planet carrier of the second planetary gearset. Further, oil can be spun toward the first planet carrier of the first planetary gearset by the action of centrifugal force. Such a gear unit does not need any new additional component parts. Component parts of the gear unit which are already available can continue to be used. Only the connection means are integrated in the gear unit, particularly in the housing. In spite of the connection device, an axially compact, comparatively less complex gear unit can be provided.

The locking effect of the gear unit is produced by a locking torque, which is substantially torque-dependent. Alternatively or additionally, the locking torque can be dependent on differential speed. A "locking value" is the quotient of the difference between the two output torques and the sum of the two output torques; that is, with a locking effect of 0%, both wheels have exactly the same torque. With a locking value of 100% percent, one output transmits 100% of the torque and the other output transmits none.

If an element is fixed, in particular to the stationary structural component, it is restrained against rotational movement. The structural component of the gear unit that is fixed with respect to relative rotation can preferably be a permanently stationary component, preferably a housing of the gear unit, a portion of such a housing or a structural component connected to the latter so as to be fixed with respect to rotation relative to it.

Friction surfaces of the connection device are preferably formed planar or conical. A connection can be produced by friction force via the friction surfaces. This means that at least two corresponding friction surfaces are arranged between the two output shafts. Every two friction surfaces form a torque-transmitting friction surface pair. The connection device can be a multiplate (friction) clutch, for example. The pressing force of the friction surfaces is brought about by a differential-speed-dependent pressing force. The conical construction provides a higher friction torque with the number of friction surfaces remaining equal. A conical friction surface is formed at a friction cone, for example. A friction plate can provide a planar friction surface, for example.

The connection device is preferably operatively arranged between the second gearset element of the first planetary gearset and the third gearset element of the second planetary gearset. In a preferred embodiment example, the connection device is operatively arranged between the planet carrier of the first planetary gearset, which is connected to the first output shaft so as to be fixed with respect to rotation relative to it, and the ring gear of the second planetary gearset which is connected to the second output shaft so as to be fixed with respect to rotation relative to it. In other words, the planet carrier of the first planetary gearset and the ring gear of the second planetary gearset are connectable or couplable with one another so as to be fixed with respect to rotation relative to one another by the connection means in a torque-dependent manner.

It is preferable that one of the friction surfaces is a direct component part of the respective gearset element. This reduces the multitude of parts and therefore lowers costs. These elements are preferably relatively large, heavy and effectively thermally connected so that, in this case, the heat developing in the friction element can be additionally favorably stored and/or dissipated. It is further preferable that at least one of the friction surfaces is arranged at a component part which guides the output torque to one of the two output shafts. The quantity of component parts of the gear unit is also reduced in this way so that costs can be reduced. Further, the same thermal advantages can be achieved. Alternatively, however, it is also contemplated to form the parts with the friction surfaces as separate component parts which, for example, are at least indirectly connected in a co-rotating manner to the respective output shaft via engagement teeth or the like.

According to an embodiment example, a first connection element of the connection means is fixedly arranged at the second gearset element of the first planetary gearset and is associated with the first output shaft. A second connection element of the connection means is fixedly arranged at the third gearset element of the second planetary gearset and is associated with the second output shaft. Two axial force introduction elements are arranged at the second connection element, the first connection element being at least indirectly axially arranged therebetween. One of the two axial force introduction elements is configured to form a first friction element pair with the first connection element. The other one of the two axial force introduction elements is arranged on an axially opposite side of the first connection element and configured to form a second friction element pair with the first connection element. The axial force introduction elements and the first connection element function as a kind of plate and enter into a frictional engagement with one another when acted upon by axial pressure depending on the direction of axial force. Regardless of the direction of axial force, the frictional engagement is brought about in the activated state of the connection device in every case between the second gearset element of the first planetary gearset and the third gearset element of the second planetary gearset, the two axial force introduction elements being axially spaced at the third gearset element of the second planetary gearset and the first connection element received at the second gearset element of the first planetary gearset being fixedly arranged therebetween. It is also contemplated to form the frictionally engaging clutch or the connection device as a cone clutch or the like. The cone clutch can be more economical in particular than an embodiment form with friction plate(s), for example, because of the smaller quantity of friction surfaces and component parts although a multiplate clutch can withstand a higher thermal load.

According to a further embodiment example, the connection device comprises a first axial force introduction element, a second axial force introduction element, a third axial force introduction element, and a fourth axial force introduction element, the first axial force introduction element and second axial force introduction element and at least one first connection element are associated with the first output shaft, and the third axial force introduction element and fourth axial force introduction element and at least one second connection element are associated with the second output shaft. In this embodiment form, the first and second axial force introduction elements of the connection device are axially spaced apart from one another and at least indirectly fixedly arranged at the first output shaft. It is also contemplated that further component parts are arranged between the first output shaft and the first and second axial force introduction elements. In every case, the first axial force introduction element and second axial force introduction element are arranged so as to be fixed with respect to rotation relative to the first output shaft. At least one first connection element is at least indirectly co-rotationally arranged at the first output shaft between the first axial force introduction element and the second axial force introduction element. The third and fourth axial force introduction elements of the connection means are axially spaced apart from one another and at least indirectly fixedly arranged at the second output shaft. It is also contemplated that further component parts are arranged between the second output shaft and the third and fourth axial force introduction elements. In every case, the third axial force introduction element and fourth axial force introduction element are arranged so as to be fixed with respect to rotation relative to the second output shaft. At least one second connection element is at least indirectly co-rotationally arranged at the second output shaft between the third axial force introduction element and the fourth axial force introduction element, and the at least first connection element enters into frictional engagement with the at least second connection element when a torque-dependent axial force from the helical toothing is active. Accordingly, owing to the axial force, a torque is transmittable between the first output shaft and second output shaft. The connection elements of the connection means are consequently arranged axially between the first axial force introduction element and second axial force introduction element and between the third axial force introduction element and the fourth axial force introduction element. The axial force introduction elements are arranged in such a way that a frictional engagement is produced between the connection elements regardless of the direction of axial force, and the axial force introduction elements transmit the axial force to the connection elements which, as a result, move toward one another until they come in frictionally engaging contact. The friction force generated in this way is proportional to the axial force acting on the connection means. This embodiment example is particularly suitable for a frictionally engaging clutch formed as a multiplate clutch. The connection elements are formed as plates which enter into frictional engagement with one another. A multiplate clutch has the advantage over a plane bearing, for example, that it can generate a larger locking torque between the two output shafts.

It is further contemplated to introduce the axial force of the third gearset element of the second planetary gearset, particularly of the second ring gear, into the housing via the connection means, the second gearset element of the first planetary gearset, particularly the first planet carrier, and the first output shaft. It would also be possible to support the second gearset element of the first planetary gearset, particularly the first planet carrier, directly at the housing instead of an axial fixed bearing support of the first output shaft at the housing. It is also contemplated to position the second output shaft axially.

Further preferably, there is arranged at the connection device at least one pressure element that transmits an axial preloading force to the connection means. A basic locking torque can be generated by the pressure element. By "basic locking torque" is meant a locking torque which is substantially independent from a transmitted torque and independent from the level of the present differential speed. The pressure element in particular brings about a constant pressing force of the friction surfaces. Preloaded springs are suitable as pressure element, particularly a pressure element formed as a plate spring, wave spring, or the like. A startup assist can be realized by preloading the output shafts.

According to an embodiment example, the connection means are formed in such a way that an unequal locking behavior of the connection device in a pull operation and in a push operation can be realized. For example, the friction partners which cooperate in the respective axial force direction can be formed differently, particularly geometrically differently or differently with respect to surface qualities or roughness characteristics. For example, the friction partners which cooperate with one another when the connection device is acted upon in the first axial force direction can have a larger friction radius or friction diameter, a larger friction surface and/or a rougher surface than friction partners which cooperate with one another when the connection means are acted upon in the opposite, second axial force direction, or vice versa. Alternatively or additionally to the preceding constructions, in case of a multiplate clutch as connection device, a different locking behavior can be realized by way of the quantity of plates on the respective side. For example, a larger quantity of plates can be operatively arranged at a first plate carrier which is operatively connected to the first output shaft than at a second plate carrier which is operatively connected to the second output shaft. In other words, different quantities of friction surface pairs can be operatively configured in pull operation and push operation, for example, by suitable arrangement of the axial force introduction elements. Further, different friction diameters can operate in pull operation and in push operation. Further, different friction angles can be arranged, in particular a planar, substantially radially extending plate in contrast to a conical friction element. Further, different friction coefficients can be provided in pull operation and in push operation. The above-mentioned aspects can be provided individually or in any combination.

The first planetary gearset and second planetary gearset are preferably adjacently arranged in axial direction. In other words, the gearset elements of the first planetary gearset are arranged in a first common plane and the gearset elements of the second planetary gearset are arranged in a second common plane, the two planes extending substantially parallel and being arranged axially adjacent to one another. The respective common plane is oriented substantially perpendicular to the respective axle of the vehicle.

Alternatively, the first planetary gearset and second planetary gearset are arranged to be radially nested. A radially nested construction of the integral differential is realized in that the first planetary gearset according to the first aspect of the invention is arranged at least in some areas radially inside of the second planetary gearset. In other words, the gearset elements of the first planetary gearset and second planetary gearset are arranged axially in a common plane. Consequently, the first planetary gearset and second planetary gearset are arranged substantially in a common wheel plane so that the gear unit may be designed to be axially short and therefore particularly compact. Accordingly, the first planetary gearset and second planetary gearset are arranged one above the other viewed radially.

Within the framework of the invention, two structural components of the gear unit being "connected" or "coupled" or "communicating with one another" so as to be co-rotationally fixed means that these structural components are permanently coupled such that they cannot rotate independently from one another. Accordingly, an enduring rotational connection is meant. In particular, there is no shift element provided between these structural components, which latter can be elements of the differential and/or also shafts and/or a co-rotationally fixed structural component of the gear unit. Rather, the corresponding structural components are fixedly coupled with one another. A torsionally elastic connection between two component parts also means that these components are fixed or co-rotationally fixed. In particular, a co-rotationally fixed connection can also include joints, e.g., in order to make possible a steering movement or a deflection of a wheel.

The term "operatively connected" means a non-shiftable connection between two component parts which is provided for a permanent transmission of a propulsion power, particularly a rotational speed and/or a torque. The connection can be made directly or via a fixed transmission. The connection can be carried out, for example, via a fixed shaft, gear teeth, particularly a spur gear toothing, and/or a belt mechanism.

By "at least indirectly" is meant that two component parts are (operatively) connected to one another via at least one further component part arranged between these two component parts or are directly and thus immediately connected to one another. Consequently, there can be arranged between shafts or toothed wheels further component parts which are operatively connected to the shaft or toothed wheel.

Further intermediately connected components formed, for example, as planetary gear unit, spur gear unit, chain drive, belt drive, angle drive, articulated shaft, torsional damper, multispeed gearbox, or the like, may be arranged between the input shaft and the drive unit. Also, further intermediately connected components such as, for example, articulated shafts, step-up gear units, spring elements and damping elements, or the like, may be arranged between the respective output shaft and the wheel which is operatively connected thereto.

In particular, a step-up gear unit or a multispeed gear unit, preferably a two-speed transmission, can additionally be arranged upstream of the gear unit. This step-up gear unit or multispeed gear unit can then also be a component part of the gear unit and used to configure an additional multiplication in that, for example, the speed of the prime mover is stepped up and the input shaft is driven at this stepped-up speed. In particular, the multispeed gear unit or step-up gear unit can take the form of a planetary transmission.

According to a second aspect of the invention, a powertrain for a vehicle comprises a gear unit according to the previous constructions and a drive unit which is operatively connected to the gear unit. The drive unit is preferably an electric machine. The input shaft of the gear unit is a rotor of the electric machine or is connected to or coupled with the rotor or a rotor shaft so as to be fixed with respect to rotation relative to it. The rotor is rotatably mounted relative to a stator of the electric machine, this stator being fixed with respect to the housing. The electric machine is preferably connected to an accumulator which supplies the electric machine with electrical energy. Further, the electric machine is preferably controllable or adjustable by means of power electronics. Alternatively, the drive unit can also be an internal combustion engine. In this case, the input shaft is a crankshaft, for example, or is connected to or coupled with a crankshaft so as to be fixed with respect to rotation relative to it.

The drive unit is preferably arranged coaxial to the integral differential. Accordingly, an additional transmission from the input shaft to the rotor shaft or the rotor or crankshaft of the drive unit is not required.

The drive unit is preferably formed as an electric machine and is arranged coaxial to the input shaft, the first output shaft being guided through a rotor of the electric machine. Accordingly, the gear unit is particularly compact.

The powertrain according to the type described above is utilizable in a vehicle. The vehicle is preferably a motor vehicle, in particular an automobile (e.g., a passenger vehicle with a weight of less than 3.5 t), bus or truck (bus and truck, e.g., with a weight of more than 3.5 t). In particular, the vehicle is an electric vehicle or a hybrid vehicle. The vehicle comprises at least two axles, one of the axles forming a drive axle drivable by the powertrain. The powertrain according to one aspect of the invention is operatively arranged at this driving axle. The powertrain transmits a propulsion power of the drive unit to the wheels of this axle via the gear unit according to the invention. It is also contemplated for each axle to be provided with a powertrain of this type. The powertrain is preferably a front transverse type construction so that the input shaft and the output shafts are oriented substantially transverse to the longitudinal direction of the vehicle. Alternatively, the powertrain can be arranged diagonal to the longitudinal axis and transverse axis of the vehicle, in which case the output shafts are connected via corresponding joints to the wheels of the respective axle which are arranged transverse to the longitudinal axis of the vehicle.

The above definitions and statements relating to technical effects, advantages and advantageous embodiment forms of the inventive gear unit according to the first aspect of the invention apply analogously to the inventive gear unit according to the second aspect of the invention and to the powertrain according to the invention, and vice versa.

BRIEF DESCRIPTION OF THE DRAWINGS

The invention will be explained in more detail in the following referring to the schematic drawings. In the drawings.

DETAILED DESCRIPTION OF THE PRESENTLY PREFERRED EMBODIMENTS

Figure 1:
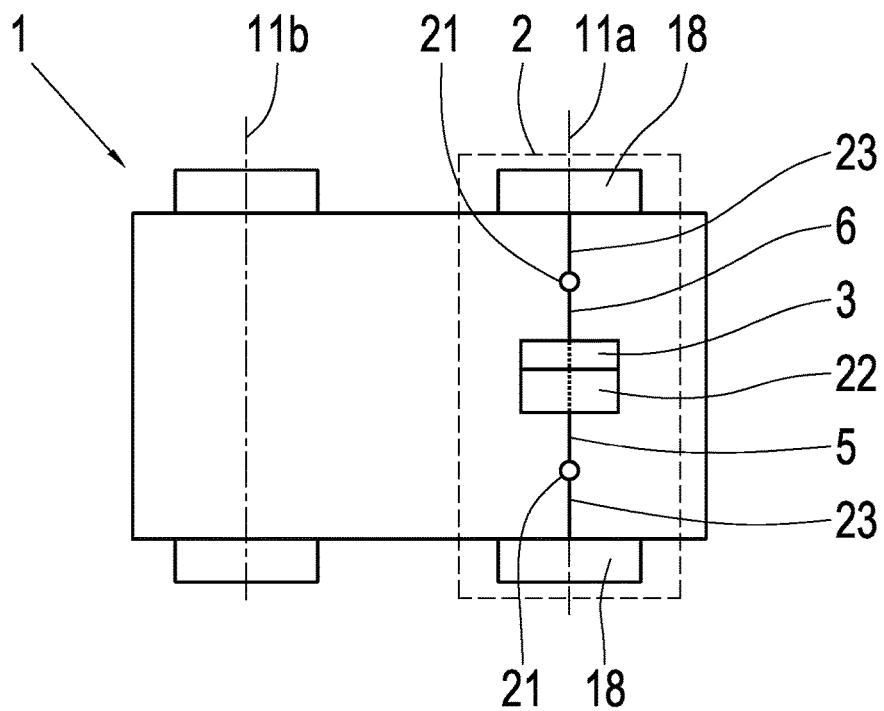
FIG. 1 is a highly schematic top view of a vehicle with a powertrain according to the invention and a gear unit according to the invention in a first embodiment form.
Figure 2:
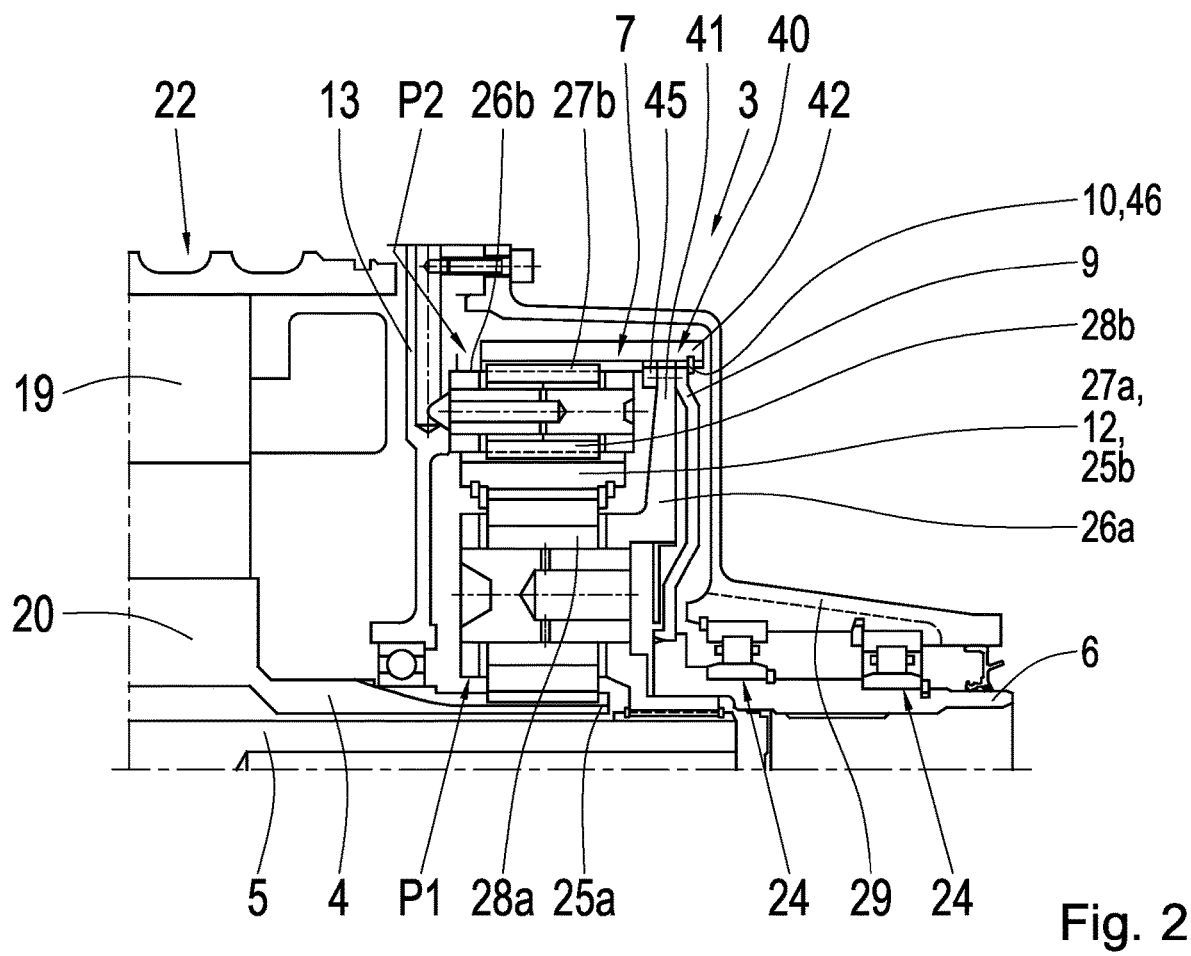
FIG. 2 is a highly schematic depiction of the gear unit from FIG. 1.

FIG. 1 shows a vehicle 1 with two axles 11a, 11b. A powertrain 2 according to one aspect of the invention is drivingly arranged at the first axle 11a. The first axle 11a may be a front axle or rear axle of the vehicle 1 and forms a driven axle of the vehicle 1. The powertrain 2 comprises a drive unit 22 constructed as an electric machine and a gear unit 3 which is operatively connected to the latter. The construction and the arrangement of the powertrain 2 in the vehicle 1, in particular the gear unit 3, will be explained in more detail in the following figures. An exemplary electric machine is shown in FIG. 2. This will be omitted in the following figures for the sake of simplicity. Only an input shaft 4 is shown, this input shaft 4 being drivingly connected to the drive unit 22 for transmitting a torque into the gear unit 3. The electric machine is supplied with electrical energy by an accumulator—not shown—which is operatively connected to a stator 19, shown in FIG. 2, which is fixed with respect to the housing. Further, the electric machine is connected to power electronics—not shown—for controlling and adjusting. By energizing the stator 19 of the electric machine, a rotor 20 which is arranged so as to be rotatable relative to the stator 19 and which is in turn connected as driveshaft to the input shaft 4 of the gear unit 3 so as to be fixed with respect to rotation relative to it is set in rotational motion relative to the stator 19. Alternatively, the input shaft 4 can also be connected to or coupled with a separate rotor shaft of the rotor 20 so as to be fixed with respect to rotation relative to it. Accordingly, the propulsion power of the drive unit 22 is guided via the input shaft 4 into the gear unit 3, where it is converted by an integral differential 7 and at least indirectly divided between a first output shaft 5 and a second output shaft 6. The drive unit 22 comprising the stator 19 and the rotor 20 is arranged coaxial to the integral differential 7.

The output shafts 5, 6, which are arranged coaxial to one another are indirectly connected in each instance to a wheel 18 in order to drive the vehicle 1. Joints 21 and wheel hubs 23 are arranged between the respective wheel 18 and the output shafts 5, 6 to compensate possible tilting of the output shafts 5, 6. Consequently, the vehicle 1 is an electric vehicle, and the drive is carried out fully electrically.

FIG. 2 to FIG. 10 show various forms of the gear unit 3. The respective gear unit 3 is a differential gear and in the present instance comprises an input shaft 4, a first output shaft 5 and a second output shaft 6. The output shafts 5, 6 are arranged coaxial to one another and extend in opposite directions toward the wheels 18 proceeding from the gear unit 3. In the present instance, the first output shaft 5 extends leftwards and the second output shaft 6 extends rightwards.

The gear unit 3 comprises an integral differential 7 which has a first planetary gearset P1 with a plurality of gearset elements and a second planetary gearset P2 which is operatively connected to the latter and which also has a plurality of gearset elements. In the present instance, at the first planetary gearset P1, the first gearset element is a first sun gear 25a, the second gearset element is a first planet carrier 26a, and the third gearset element is a first ring gear 27a. A plurality of first planet gears 28a in meshing engagement with the first sun gear 25a and the first ring gear 27a are rotatably arranged at the first planet carrier 26a. Further, at the second planetary gearset P2, the first gearset element is a second sun gear 25b, the second gearset element is a second planet carrier 26b, and the third gearset element is a second ring gear 27b. A plurality of second planet gears 28b in meshing engagement with the second sun gear 25b and the second ring gear 27b are rotatably arranged at the second planet carrier 26b.

The first planetary gearset P1 and the second planetary gearset P2 are formed, respectively, as negative planetary gearset, the first planetary gearset P1 being arranged radially inwardly of the second planetary gearset P2. Consequently, the integral differential 7 is constructed in a radially nested manner.

In the embodiment examples described in the following, the first sun gear 25a of the first planetary gearset P1 is connected to the input shaft 4 so as to be fixed with respect to rotation relative to it. The first planet carrier 26a of the first planetary gearset P1 is connected to the first output shaft 5 so as to be fixed with respect to rotation relative to it. The first output shaft 5 extends axially through the input shaft 4, the first sun gear 25a and the rotor 20 of the drive unit 22 according to FIG. 1 and FIG. 2. Consequently, the first sun gear 25a is formed as a ring gear and the input shaft 4 which is connected to the latter so as to be fixed with respect to rotation relative to it is constructed as a hollow shaft. The first ring gear 27a of the first planetary gearset P1 is connected to the second sun gear 25b of the second planetary gearset P2 so as to be fixed with respect to rotation relative to it via a coupling shaft 12. The second planet carrier 26b of the second planetary gearset P2 is arranged so as to be fixed with respect to the housing and secured to a stationary structural component 13. The second ring gear 27b of the second planetary gearset P2 is connected to the second output shaft 6 so as to be fixed with respect to rotation relative to it.

A first output torque is transmittable to the first output shaft 5 by means of the first planetary gearset P1. A reaction torque of the first planetary gearset P1 is transformable in the second planetary gearset P2 such that a second output torque corresponding to the first output torque is transmittable to the second output shaft 6.

The above-mentioned gearset elements of the first planetary gearset P1 and second planetary gearset P2 have, in each instance, a helical toothing which generates and axially acting engagement force depending on an applied torque independent from the power flow, this axial force acting on connection device 40 of the gear unit 3. In a pull operation of the powertrain 2, the power flow runs from the input shaft 4, at which the propulsion power of the drive unit 21 is introduced into the gear unit 3, to the two output shafts 5, 6 via the planetary gearsets P1, P2 of the integral differential 7. In a push operation of the powertrain 2, the power flow runs in the reverse direction from the respective output shaft 5, 6 via the planetary gearsets P1, P2 of the integral differential 7 to the input shaft 4, where the propulsion power is introduced into the drive unit 22. In push operation, the drive unit 21 can be operated in generator mode for generating electrical energy.

The connection device 40 is arranged and configured to at least indirectly connect the first output shaft 5 and second output shaft 6 for both axial force directions from the helical toothing of the gearset elements, i.e., regardless of the axial force direction from the helical toothing of the gearset elements, such that a torque is transmittable between the output shafts 5, 6. The direction of the axial force depends on the direction of the driving torque. The direction of the torque at the connection means 40 depends on the sign of the differential speed of the output shafts 5, 6. In the present instance, the connection device 40 is operatively arranged between the second gearset element of the first planetary gearset P1, i.e., the first planet carrier 26*a*, and the third gearset element of the second planetary gearset P2, i.e., the second ring gear 27*b*.

The second gearset element of the first planetary gearset P1, i.e., in this case, the first planet carrier 26*a*, is supported so as to be axially fixed, whereas the third gearset element of the second planetary gearset P2, i.e., the second ring gear 27*b*, is axially displaceable. The axial movability of the second ring gear 27*b* is very limited because only a small distance need be traveled to activate the connection means 40 in order to realize a transmission of torque between the output shafts 5, 6.

The axial movability of the second ring gear 27*b* can be achieved, for example, in that a structural component part, for example, an arm segment 9 analogous to FIG. 2, transmitting a torque from the second ring gear 27*b* to the second output shaft 6 enables a defined elastic deformability and guides such that the second ring gear 27*b* can move axially relative to the rest of the gearset elements of the differential 7 in such a way that an activation of the connection device 40 is possible. In this case, the second output shaft 6 can be supported by means of a fixed bearing so as to be axially fixed. In the activated or actuated state of the connection device 40, a torque which is dependent on the engagement forces of the helical teeth is transmitted between the output shafts 5, 6. In the activated or actuated state of the connection device 40, a locking effect of the output shafts 5, 6 is achieved. FIG. 2 shows an alternative embodiment. In the present instance, the second output shaft 6 is axially loosely, i.e., floatingly, supported relative to the housing 29 by means of two cylindrical roller bearings 24. Accordingly, a defined elasticity of the arm segment 9 is not required because the axial movability of the second ring gear 27*b* is made possible via the floating support of the second output shaft 6. The first output shaft 5 is supported in an axially fixed manner relative to the housing 29 via a fixed bearing, not shown.

In each of the examples to be described in detail in the following, the connection device 40 is a frictionally engaging clutch in which friction surfaces of the friction partners of the connection device 40 connectable with one another by frictional engagement are formed substantially planar in the present case. However, the friction surfaces which are operatively connectable with one another can have any shape in principle, for example, conical friction surfaces or the like.

In the first embodiment example according to FIG. 2, a first connection element 41 of the connection device 40 is fixedly arranged at the second gearset element of the first planetary gearset P1 and is associated with the first output shaft 5. A second connection element 42 of the connection means 40 is fixedly arranged at the third gearset element of the second planetary gearset P2 and is associated with the second output shaft 6. Two axial force introduction elements 45, 46 are arranged at the second connection element 42, the first connection element 41 being at least indirectly axially arranged therebetween. "Fixed" in the present case means that the first connection element 41 is secured at the inner first planet carrier 26*a* against an axial movement and against a relative rotation and that the second connection element 42 is secured at the outer second ring gear 27*b* against an axial movement and against a relative rotation. The axial force from the helical toothing of the outer ring gear 27*b* is supported in pull operation and in push operation via one of the two axial force elements 45, 46 at the first planet carrier 26*a* which enters into frictional contact either with the third axial force introduction element 45 or with the fourth axial force introduction element 46 depending on the action direction of the axial force. Accordingly, the ring gear 27*b* is axially moved by the engagement forces in such a way that when the connection means 40 are actuated either the third axial force introduction element 45 or the fourth axial force introduction element 46 moves axially slightly toward the respective friction portion of the first connection element 41 which is arranged at the first planet carrier 26*a*. Consequently, the first connection element 41 is operatively arranged axially between the two axial force introduction elements 45, 46 which are at least axially fixedly arranged at the second connection element 42. The friction surfaces forming the respective friction partners or friction surface pairs are arranged to be axially flush. The first connection element 41 and the axial force introduction elements 45, 46 function in the form of plates which come in frictional contact with one another depending on the axial force direction for the torque transmission. The first friction surface pair is formed by the first connection element 41 and the third axial force introduction element 45 which is arranged leftward of the latter. The second pair of friction surfaces is formed by the first connection element 41 and the fourth axial force introduction element 46 arranged rightward of the latter. In this case, the fourth axial force introduction element 46 is simultaneously the arm segment 9 which transmits the axial force from the second ring gear 27*b* to the second output shaft 6, and vice versa. The second ring gear 27*b* or the third gearset element of the second planetary gearset P2 is at least axially movable until the respective axial force introduction element 45, 46 comes in contact with the first connection element 41 which is connected to the first planet carrier 26*a* so as to be fixed with respect to rotation relative to it and generates the axial force for achieving the locking effect. In the present instance, the first connection element 41 and the first planet carrier 26*a* are formed integrally, the first connection element 41 being a substantially radially extending arm which forms the friction partner of the axial force introduction elements 45, 46. The axial force introduction elements 45, 46 are held in their axial position in the present instance by a retaining ring 10. The transmission of torque between the axial force introduction elements 45, 46 and the second ring gear 27*b* is carried out by means of engagement teeth, not shown in more detail.

The engagement forces of the helical toothing causing the axial force are proportional to the driving torque applied to the input shaft 4. The friction torque or locking torque at the friction surface pairs or friction partners of the clutch is proportional to the axial force. The locking torque is adjustable via the quantity of friction surfaces, the friction diameter, a possible cone angle in case of conical friction elements or friction surfaces, and/or the selection and configuration of the friction pairs, particularly via the friction coefficient. In the example shown in FIG. 2, the two pairs of friction surfaces are formed identically so that the same torque-dependent locking effect or the same locking torque can be generated in pull operation and push operation with the same axial force. Accordingly, in the present instance, a separate friction surface pair is associated with each axial force direction.

According to the embodiment examples shown in FIGS. 3 to 10, the connection device 40 is a frictionally engaging clutch formed as multiplate clutch. In the multiplate clutch, the axial force brought about by the helical toothing of the gearset elements is utilized as adjusting force for the plates. This will be described in the following.

Figure 3:
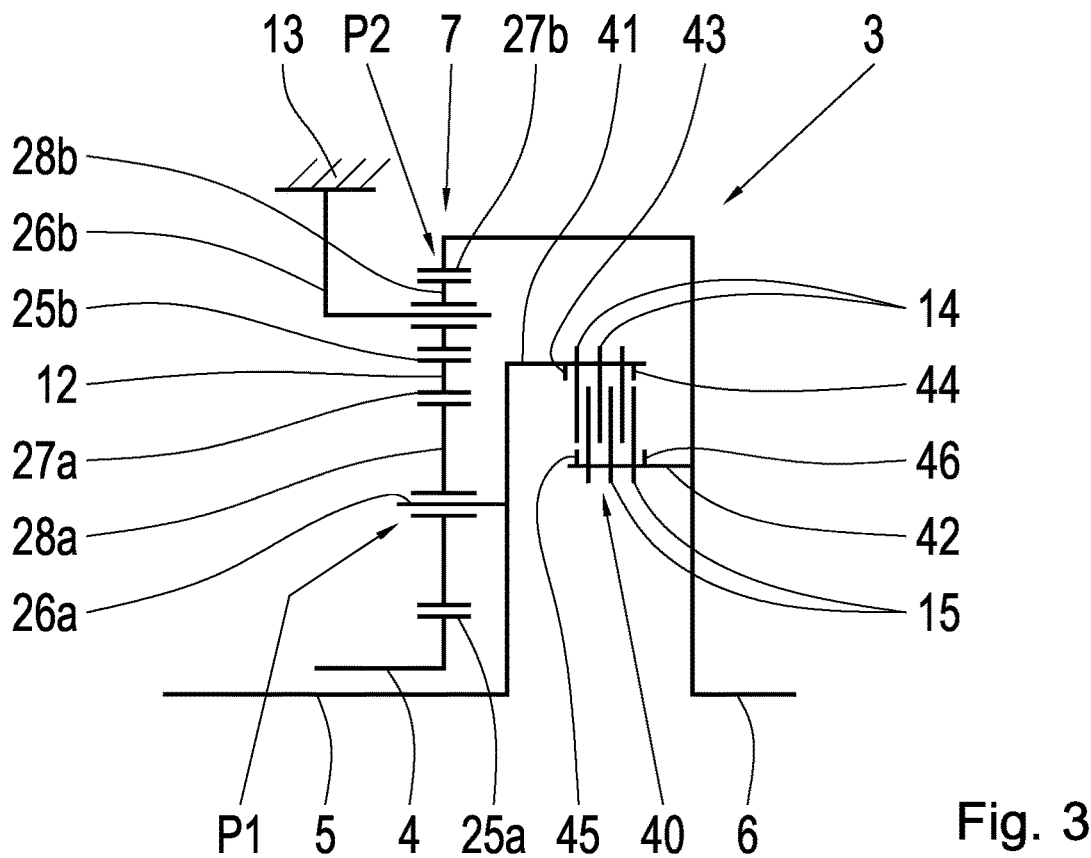
FIG. 3 is a highly schematic depiction of the gear unit.

According to FIGS. 3 to 10, the connection means 40 comprise a first axial force introduction element 43, a second axial force introduction element 44, a third axial force introduction element 45 and a fourth axial force introduction element 46, a first connection element 41 and a second connection element 42. In this instance, the first connection element 41 is to be understood as first plate carrier which is fixedly connected to the first planet carrier 26*a* and the first output shaft 5. A plurality of first plates 14 are arranged at the first connection element 41 or the first plate carrier so as to be fixed with respect to rotation relative to it and axially displaceable. The second connection element 42 is understood in this case as second plate carrier which is fixedly connected to the second ring gear 27*b* and the second output shaft 6. A plurality of second plates 15 are arranged at the second connection element 42 or second plate carrier so as to be fixed with respect to rotation relative to it and axially displaceable. The first plates 14 and second plates 15 are arranged to alternate in axial direction and can be brought into frictional engagement with one another in the actuated state of the connection device 40, that is, when an axial force acts on the connection means, in order to realize the above-mentioned locking effect. A first plate 14 and a second plate 15 which directly axially adjoins the latter form a friction pair. FIG. 3 shows the gear unit 3 in the unloaded state, i.e., when the powertrain 2 has been switched off.

The first axial force introduction element 43, second axial force introduction element 44 and first connection element 41 with the first plates 14 arranged thereon are associated with the first output shaft 5. The third axial force introduction element 45, fourth axial force introduction element 46 and second connection element 42 with the second plates 15 arranged thereon are associated with the second output shaft 6. The plates 14, 15 form a plate stack whose axial movability is limited at one axial end either by the first axial force introduction element 43 or the third axial force element 45 and at the opposite end by the second axial force introduction element 44 or the fourth axial force element 46. Accordingly, the plates 14, 15 are bracketed by two axial force introduction elements 43, 44, 45, 46 in each instance. Depending on the action direction of the axial force, the second ring gear 27*b* with the second connection element 42 and the third axial force element 45 and fourth axial force element 46 fastened thereto is moved in such a way relative to the first connection element 41 with the first axial force element 43 and second axial force element 44 fastened thereto that plates 14, 15 are pressed together. The adjusting movement of the plates 14, 15 is transmitted either via the first axial force introduction element 43 and the diagonally opposite fourth axial force introduction element 46 (see FIG. 5) or via the second axial force introduction element 44 and the diagonally opposite third axial force introduction element 45 (see FIG. 6).

The axial force introduction elements 43, 44, 45, 46 are axially fixedly arranged at the respective connection element 41, 42 or plate carrier. They can be constructed, for example, as annular elements. In the example according to FIG. 5, the second ring gear 27*b* is shifted leftwards as a result of the axial force from the helical toothing of the gearset elements in order to achieve an actuation of the connection device 40 for initiating a locking torque. In the example shown in FIG. 6, the second ring gear 27*b* is shifted rightwards as a result of the axial force from the helical toothing of the gearset elements acting in the opposite direction so as also to achieve an actuation of the connection device 40 for initiating a locking torque. In contrast to FIG. 5, in which all of the plate pairs enter into frictional engagement with one another, only two plate pairs instead of three plate pairs are formed because of the quantity and arrangement of the plates 14, 15 and the axial force direction. While a locking torque is also generated in this case, the maximum transmittable locking torque is smaller compared to when the axial force acts in the opposite direction according to FIG. 5. To this effect, a locking torque is adjustable separately for pull operation and push operation, and the connection device 40 act in a torque-sensing manner depending on the axial force and the resulting axial movement of the plates 14, 15. The connection device 40 is constructed in such a way that an unequal locking behavior of the connection means 40 is realized in a pull operation and in a push operation. The manner of operation and the action direction of the component parts cooperating with one another can also be reversed depending on the helix direction of the helical teeth of the gearset elements.

Figure 5:
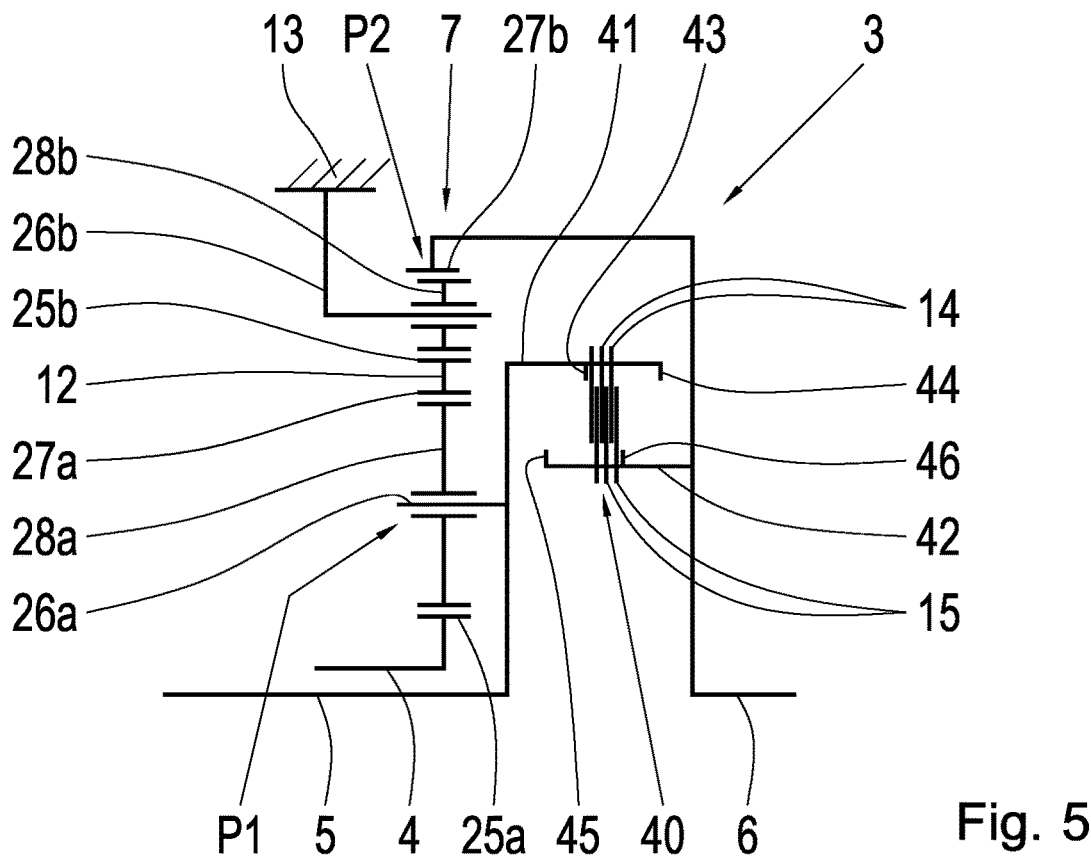
FIG. 5 is a highly schematic depiction of the gear unit according to FIG. 3 in a first locking position.
Figure 6:
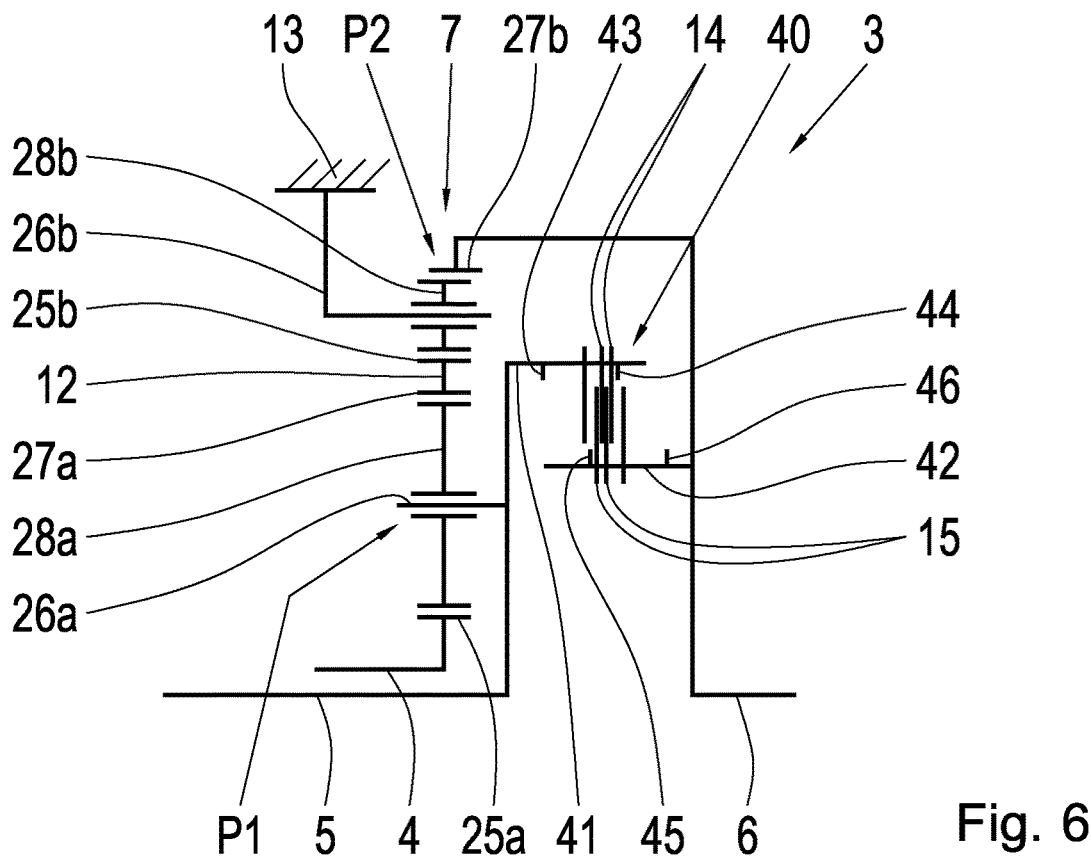
FIG. 6 is a highly schematic depiction of the gear unit according to FIG. 3 in a second locking position.
Figure 7A:
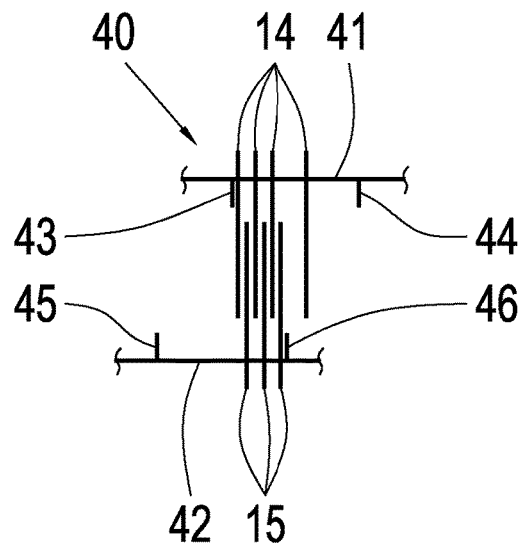
FIG. 7a is a highly schematic depiction of a multiplate clutch of the gear unit according to the invention in a first locking position.
Figure 7B:
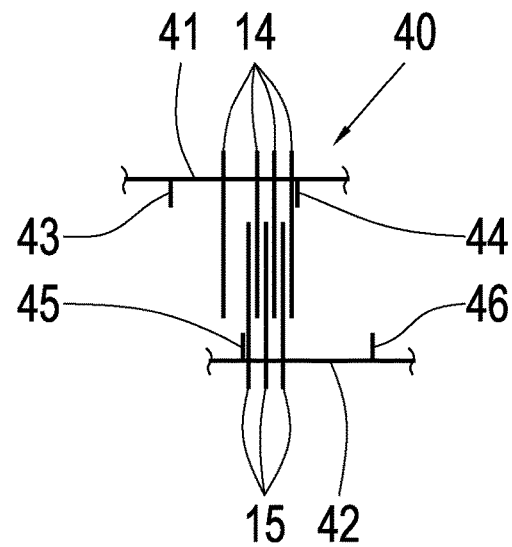
FIG. 7b is a highly schematic depiction of the multiplate clutch according to FIG. 7a in a second locking position.
Figure 7C:
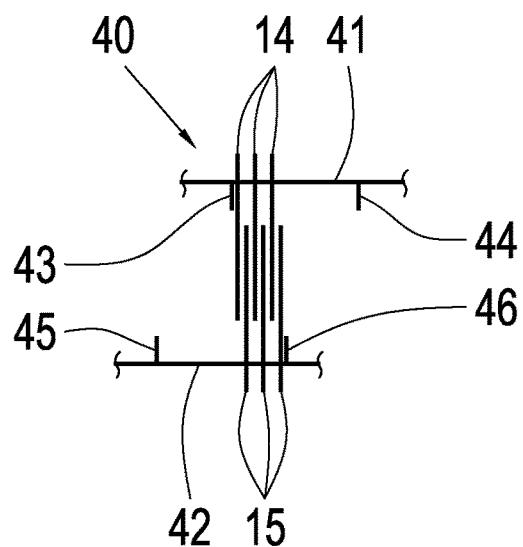
FIG. 7c is a highly schematic depiction of a multiplate clutch of the gear unit according to FIG. 5 in the first locking position.
Figure 7D:
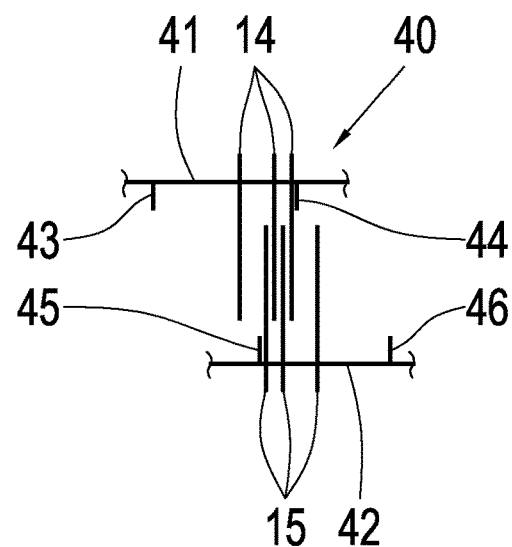
FIG. 7d is a highly schematic depiction of the multiplate clutch according to FIG. 6 in the second locking position.

FIG. 7*c* shows a detailed view of the connection means 40 in the first locking position analogous to FIG. 5. FIG. 7*d* shows a detailed view of the connection device 40 in the second locking position analogous to FIG. 6. As regards FIG. 7*c* and FIG. 7*d*, reference is made to the statements referring to FIG. 5 or FIG. 6.

In the embodiment example according to FIG. 3 and FIG. 5, FIG. 6, FIG. 7*c* and FIG. 7*d*, the first connection element 41 or the first plate carrier is an outer plate carrier. The three first plates 14 are understood to be outer plates. Conversely, the second connection element 42 or the second plate carrier is an inner plate carrier, and the three second plates 15 are understood to be inner plates.

Figure 4:
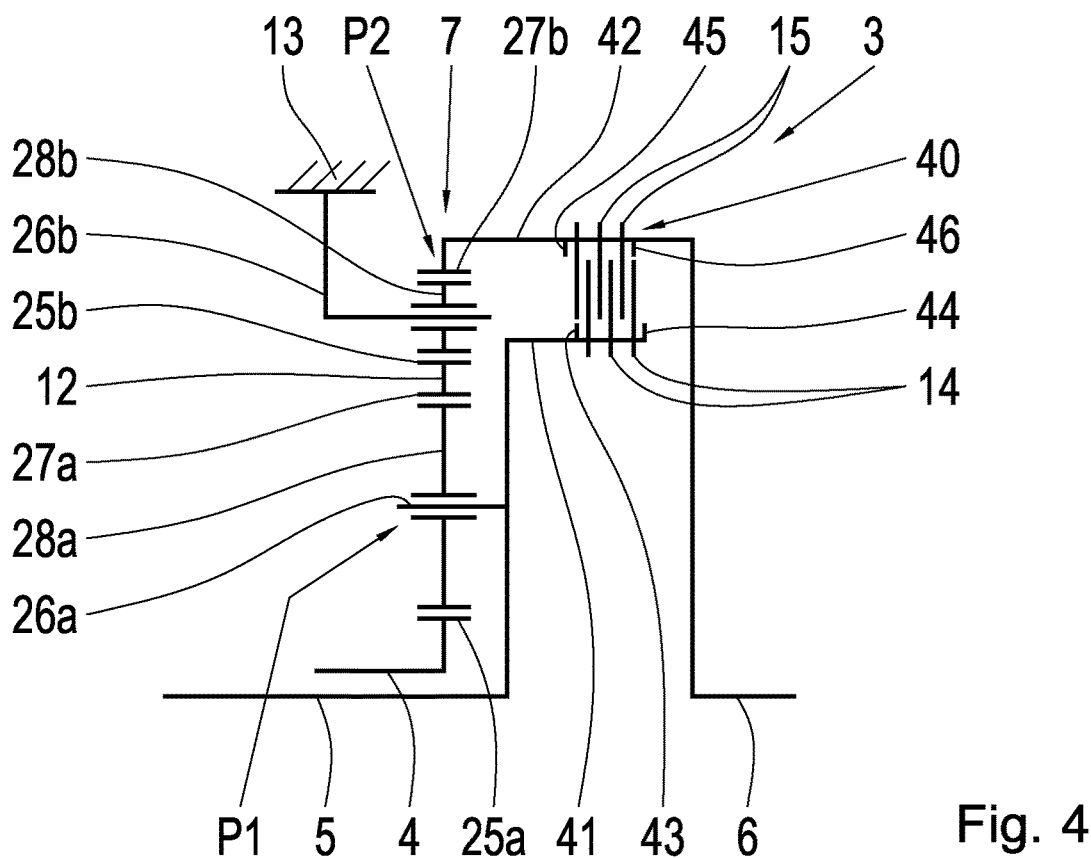
FIG. 4 is a highly schematic depiction of the gear unit.

In the embodiment example according to FIG. 4, the first connection element 41 or the first plate carrier is an inner plate carrier. The three first plates 14 are understood to be inner plates. Conversely, the second connection element 42 or the second plate carrier is an outer plate carrier, the three second plates 15 being understood as outer plates.

In the two embodiment examples according to FIGS. 3 to 6, the axial force introduction elements 45, 46 of the second connection element 42 are moved in such a way toward the axial force introduction elements 43, 44 of the first connection element 41 as a result of an axial movement of the second ring gear 27*b* caused by axial force that the plates 14, 15 are connected to one another in frictional engagement and accordingly transmit a torque between the first planet carrier 26a and the second ring gear 27b or the two output shafts 5, 6.

FIGS. 7a and 7b show a further embodiment example of the connection means 40 in the two locking positions. In the present instance, four first plates 14 are arranged at the first connection element 41 so as to be fixed with respect to relative rotation and axially displaceable, and three second plates are arranged at the second connection element 42 so as to be fixed with respect to relative rotation and axially displaceable. A second plate 15 is arranged in each instance axially between two first plates 14. In this embodiment example, the respective locking effect is identical in both axial force directions from the helical toothing of the gearset elements, since three pairs of plates comprising a first plate 14 and second plate 15 come into frictional engagement with one another in both axial force directions with the plates 14, 15 being pressed together correspondingly. Depending on force direction, the foremost or rearmost first plate 14 in axial direction does not transmit any torque and it is accordingly not loaded or does not come in frictional contact—or not so as to transmit torque—with the respective second plate 15 axially adjacent to it.

Figure 8:
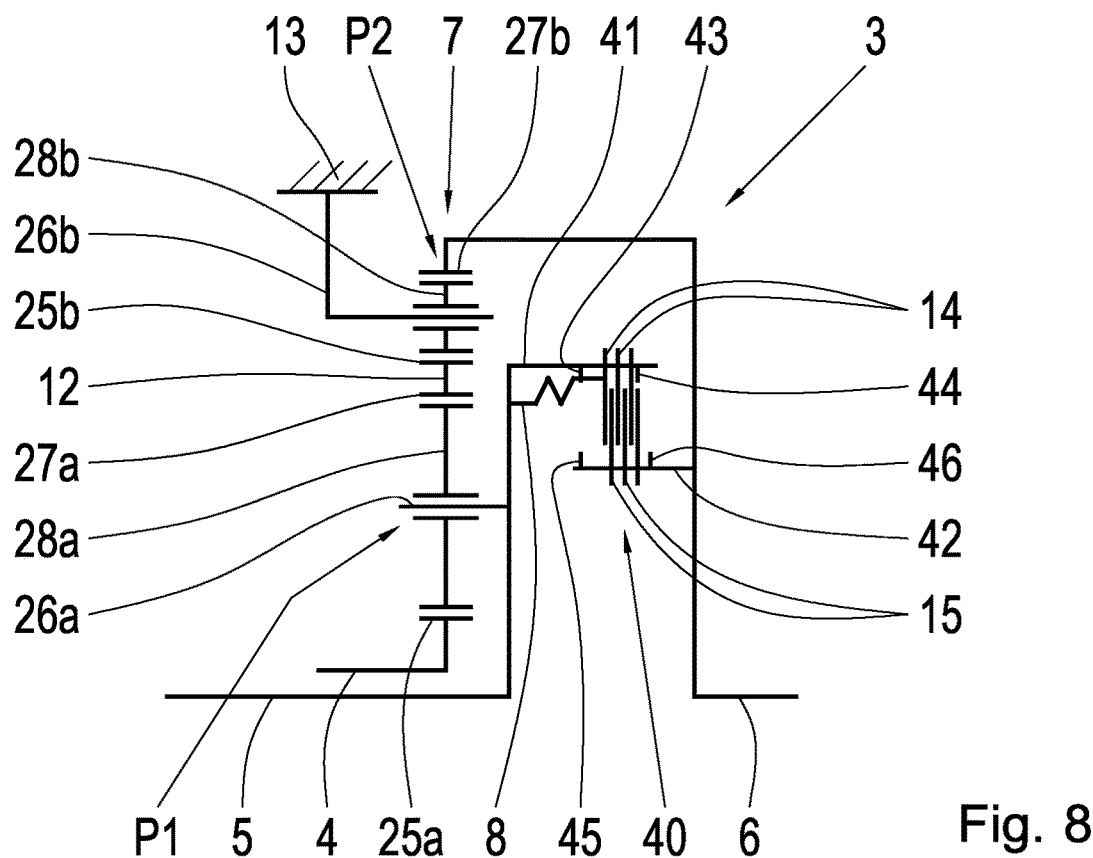
FIG. 8 is a highly schematic depiction of the gear unit.
Figure 9:
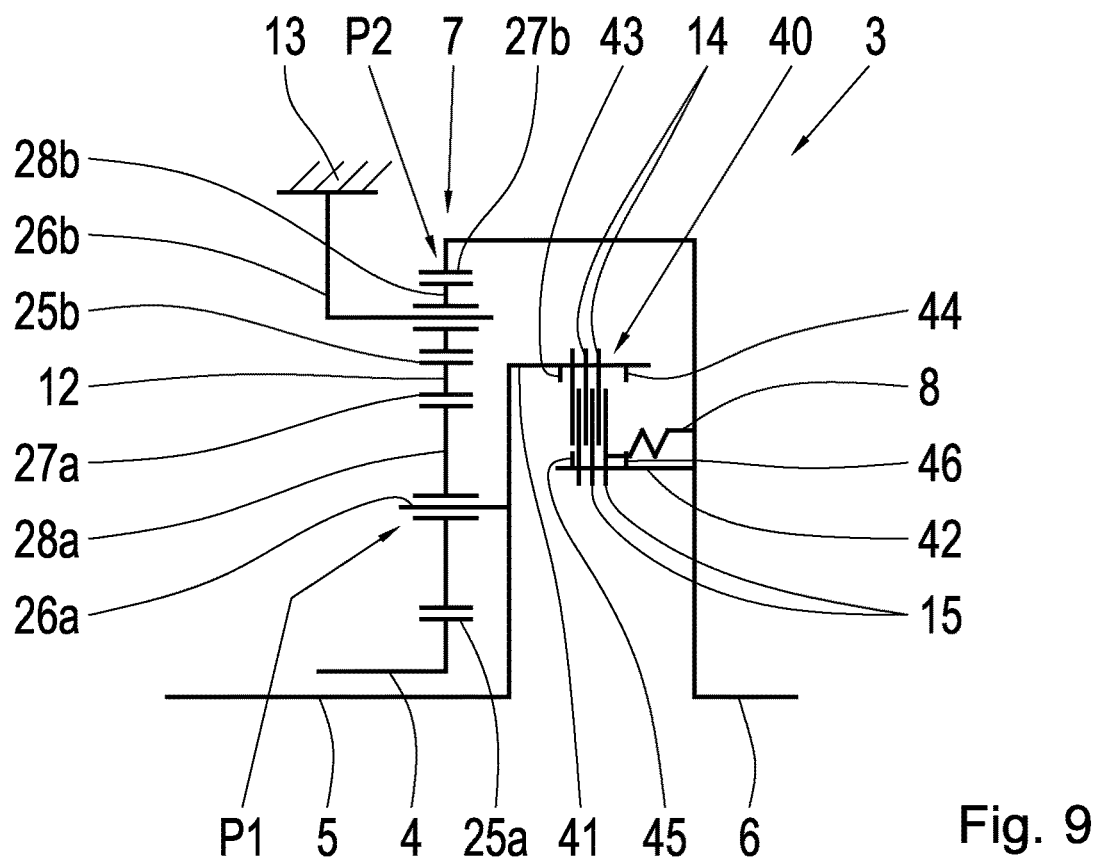
FIG. 9 is a highly schematic depiction of the gear unit.

FIG. 8 and FIG. 9 show a gear unit 3 substantially identical to that shown in FIG. 3. The difference consists in that a pressure element 8 is arranged at the connection device 40 that transmits an axial preloading force to the connection device 40. In FIG. 8, the pressure element 8 is arranged at the first connection element 41, formed in this case as outer plate carrier, and generates a preloading force rightwards. In FIG. 9, the pressure element 8 is arranged at the second connection element 42, formed in this case as inner plate carrier, and generates a preloading force leftwards. The pressure element 8 is formed in this case as a pressure spring. The pressure element 8 functions as a preloading element and generates a basic locking torque between the first output shaft 5 and second output shaft 6. This provides a startup assist, particularly when there is slippage at one of the wheels 18 operatively connected to the respective output shaft 5, 6.

For all of the embodiment examples having the axial force introduction elements 43, 44, 45, 46 in the connection means 40 formed as multiplate clutch, it is noted that the connection device 40 can be formed in such a way that the axial force introduction elements 43, 44, 45, 46 do not come directly in contact with one of the plates 14, 15 when the connection device 40 are actuated or activated so that the plates 14, 15 are not to be correspondingly designed for this purpose. Further, the connection device 40 is formed in such a way that there is no differential speed at the stops or at the axial force introduction elements 43, 44, 45, 46 which can be formed in the embodiment examples described here as a kind of retaining ring, for example, so that the latter are not to be designed as additional friction elements. In this connection, it is contemplated that the respective axially outermost plates 14 and 15 of the plate stack formed by the alternately arranged plates 14, 15 are connected integral with the respective axial force introduction elements 43, 44, 45, 46 axially adjoining them. In this case, a differential speed can be present at the respective plates 14, 15 which are fixed with respect to relative rotation and, in this case, also axially fixed.

Figure 10:
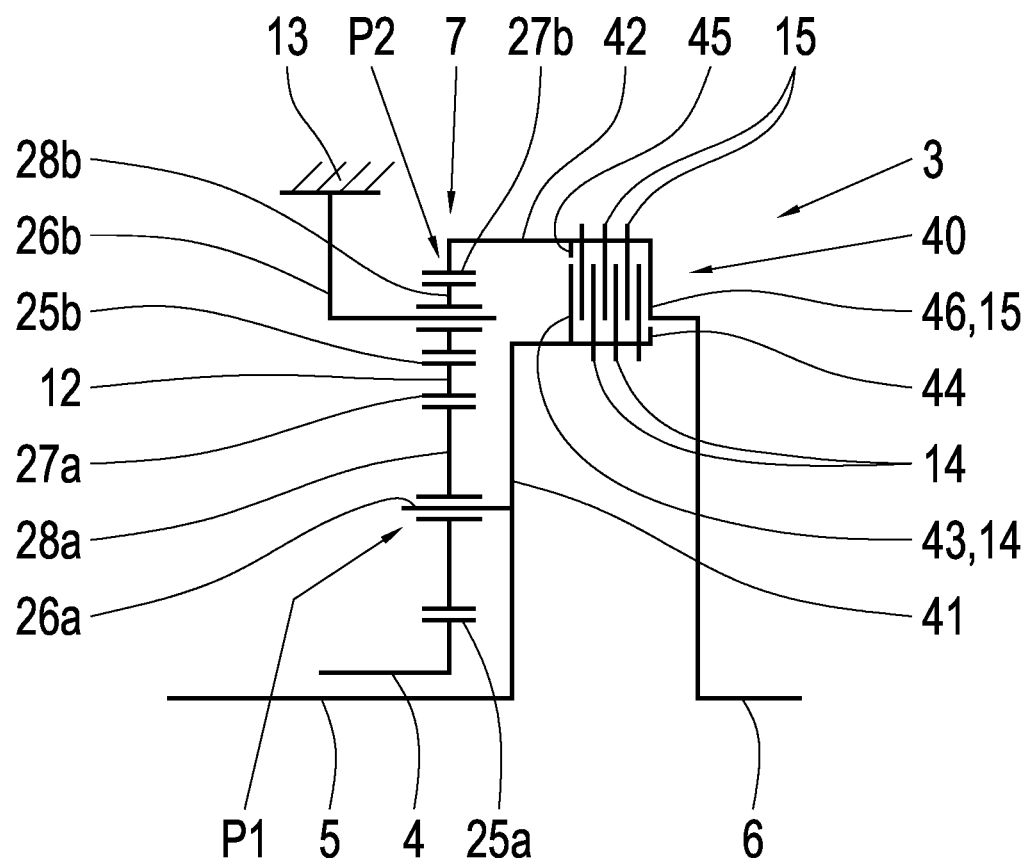
FIG. 10 is a highly schematic depiction of the gear unit.

FIG. 10 shows a gear unit 3 which is substantially identical to that shown in FIG. 4. The difference in the present instance consists in the arrangement and construction of the axial force introduction elements 43, 44, 45, 46.

The second axial force introduction element 44 and the third axial force introduction element 45 are identical to the embodiment example according to FIG. 4. The first axial force introduction element 43 arranged at the first connection element 41 so as to be fixed with respect to rotation relative to it is connected integral with the latter and is formed in such a way that it functions as a plate which forms a friction element pair with the second plate 15 arranged on the left-hand side when the connection device 40 is acted upon by axial force. The fourth axial force introduction element 46 arranged at the second connection element 42 so as to be fixed with respect to rotation relative to it is connected integral with the latter and is formed in such a way that it functions as a plate which forms a friction element pair with the first plate 14 arranged on the right-hand side when the connection device 40 is acted upon by axial force. For the rest, reference is made to the statements referring to the embodiment example according to FIG. 4.

It is explicitly noted that the association of the gearset elements with the elements of the respective planetary gearset P1, P2 can be switched in any desired manner. The respective connection of the gearset elements comprising sun gear, planet carrier and ring gear is carried out depending on the requirements for the transmission ratios, including signs. Instead of a negative planetary gearset, the respective planetary gearset P1, P2 can also always be a positive planetary gearset by switching the connection of planet carrier and ring gear and increasing the amount of the stationary gear ratio by one. The reverse is also possible in an analogous manner.

Further, it is contemplated that an additional step-up gear unit, which is not shown and which is formed, for example, as a planetary transmission with one or more planetary gearsets, is arranged between the drive unit 22 and the gear unit 3 in order to increase the overall transmission ratio of the drive.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for a powertrain of a vehicle, comprising:
   an input shaft;
   a first output shaft;
   a second output shaft; and
   an integral differential operatively arranged between the input shaft and the first and second output shafts, comprising:
   a first planetary gearset with a plurality of gearset elements;
   a second planetary gearset with a plurality of second gearset elements which is operatively connected to the first planetary gearset;

a first gearset element of the first planetary gearset is connected to the input shaft so as to be fixed with respect to rotation relative to it;

a second gearset element of the first planetary gearset is connected to the first output shaft to be fixed with respect to rotation relative to it; and a third gearset element of the first planetary gearset is connected to a first gearset element of the second planetary gearset to be fixed with respect to rotation relative to it;

a second gearset element of the second planetary gearset is connected to a stationary structural component to be fixed with respect to rotation relative to it; and a third gearset element of the second planetary gearset is connected to the second output shaft to be fixed with respect to rotation relative to it, wherein a first output torque is at least indirectly transmittable to the first output shaft by the first planetary gearset, wherein a reaction torque of the first planetary gearset is convertible in the second planetary gearset such that a second output torque corresponding to the first output torque is transmittable to the second output shaft, a connection device acted on by a torque-dependent axial force generated by a helical toothing of the gearset elements of the first planetary gearset and second planetary gearset;

wherein the connection device is arranged and formed to at least indirectly connect the first output shaft and second output shaft, independent from an axial force direction from the helical toothing of the gearset elements that a torque is transmittable between the first and second output shafts.

2. The gear unit according to claim 1, wherein the second gearset element of the first planetary gearset is axially fixedly supported, and the third gearset element of the second planetary gearset axially displaceably is supported.

3. The gear unit according to claim 1, wherein the connection device is a frictionally engaging clutch.

4. The gear unit according to claim 3, wherein friction surfaces of the connection device are one of planar and conical.

5. The gear unit according to claim 1, wherein the connection device is operatively arranged between the second gearset element of the first planetary gearset and the third gearset element of the second planetary gearset.

6. The gear unit according to claim 5, wherein a first connection element of the connection device is fixedly arranged at the second gearset element of the first planetary gearset and is associated with the first output shaft, wherein a second connection element of the connection device is fixedly arranged at the third gearset element of the second planetary gearset and is associated with the second output shaft, and wherein two axial force introduction elements (45, 46) are arranged at the second connection element, the first connection element being at least indirectly axially arranged therebetween.

7. The gear unit according to claim 1, wherein the connection device comprise a first axial force introduction element, a second axial force introduction element, a third axial force introduction element, and a fourth axial force introduction element, wherein the first axial force introduction element, the second axial force introduction element, and at least one first connection element are associated with the first output shaft, and wherein the third axial force introduction element and fourth axial force introduction element and at least one second connection element are associated with the second output shaft.

8. The gear unit according to claim 1, wherein the connection device is a multiplate clutch.

9. The gear unit according to claim 1, wherein at least one pressure element arranged at the connection device and is configured to transmit an axial preloading force to friction surfaces of the connection device.

10. The gear unit according to claim 1, wherein the connection device is configured such that an unequal locking behavior of the connection device in a pull operation and in a push operation can be realized.

11. The gear unit according to claim 1, wherein the first planetary gearset and second planetary gearset are adjacently arranged in axial direction, or the first planetary gearset is arranged radially inside of the second planetary gearset.

12. A powertrain for a vehicle, comprising at least one gear unit according to claim 1; and a drive unit which is operatively connected to the gear unit.

13. The powertrain according to claim 12, wherein the drive unit is arranged coaxial to the integral differential.

14. The powertrain according to claim 12, wherein the drive unit is an electric machine and is arranged coaxial to the input shaft, wherein the first output shaft is guided through a rotor of the electric machine.

* * * * *